United States Patent
Nam et al.

(10) Patent No.: US 10,902,984 B2
(45) Date of Patent: Jan. 26, 2021

(54) LINEAR ACTUATOR HAVING AN ELASTIC INJECTION-MOLDED FRAME

(71) Applicant: EM-TECH. Co., Ltd., Busan (KR)

(72) Inventors: Ki Hyun Nam, Gyeongsangnam-do (KR); Jae Baek Jang, Gyeongsangnam-do (KR); Young Uk Jo, Gyeongsangnam-do (KR)

(73) Assignee: EM-TECH. CO., LTD., Busan (KR)

( * ) Notice: Subject to any disclaimer, the term of this patent is extended or adjusted under 35 U.S.C. 154(b) by 199 days.

(21) Appl. No.: 16/173,775

(22) Filed: Oct. 29, 2018

(65) Prior Publication Data
US 2019/0131045 A1    May 2, 2019

(30) Foreign Application Priority Data

Oct. 30, 2017    (KR) .......................... 10-2017-0142213

(51) Int. Cl.
| | |
|---|---|
| *H01F 7/02* | (2006.01) |
| *H02K 33/16* | (2006.01) |
| *B06B 1/04* | (2006.01) |
| *H01F 3/14* | (2006.01) |
| *H02K 33/02* | (2006.01) |
| *H02K 41/035* | (2006.01) |

(52) U.S. Cl.
CPC ............. *H01F 7/021* (2013.01); *B06B 1/045* (2013.01); *H01F 3/14* (2013.01); *H02K 33/16* (2013.01); *H02K 33/02* (2013.01); *H02K 41/0356* (2013.01)

(58) Field of Classification Search
USPC ........................................................ 335/306
See application file for complete search history.

(56) References Cited

U.S. PATENT DOCUMENTS

| | | | | |
|---|---|---|---|---|
| 3,312,841 | A * | 4/1967 | Makino ................... | H02K 33/04 310/15 |
| 6,940,582 | B1 * | 9/2005 | Tanaka .................... | G03F 7/709 355/53 |
| 10,252,295 | B2 * | 4/2019 | Takeda .................... | H02K 33/02 |

(Continued)

FOREIGN PATENT DOCUMENTS

| | | |
|---|---|---|
| CN | 1427633 A | 7/2003 |
| CN | 1893736 A | 1/2007 |

(Continued)

*Primary Examiner* — Shawki S Ismail
*Assistant Examiner* — Lisa N Homza
(74) *Attorney, Agent, or Firm* — Murphy, Bilak & Homiller, PLLC

(57) ABSTRACT

A linear actuator having an elastic injection-molded frame includes a yoke, a permanent magnet attached to a bottom surface of the yoke at a distance from a side surface of the yoke, a top plate attached to a top surface of the permanent magnet, a frame coupled to an outer periphery of the yoke and injection-molded with an elastic material, a protector disposed on the frame, and a coil secured to the protector, with a lower end positioned between the permanent magnet and the side surface of the yoke. The frame includes a yoke coupling portion coupled to the yoke, a fixing portion spaced apart from the yoke coupling portion and coupled to the protector, and two or more bridges for elastically connecting the yoke coupling portion and the fixing portion.

8 Claims, 10 Drawing Sheets

(56) References Cited

U.S. PATENT DOCUMENTS

| | | | | |
|---|---|---|---|---|
| 2004/0218778 A1* | 11/2004 | Weisman | .............. | H04R 7/16 |
| | | | | 381/396 |
| 2006/0033385 A1* | 2/2006 | Ito | .............. | H02K 1/145 |
| | | | | 310/12.27 |
| 2006/0186977 A1* | 8/2006 | Ito | .............. | H02K 3/525 |
| | | | | 335/220 |
| 2006/0266967 A1 | 11/2006 | Miura | | |
| 2007/0290632 A1* | 12/2007 | Stevens | .............. | A61H 1/003 |
| | | | | 318/135 |
| 2008/0204174 A1* | 8/2008 | Ito | .............. | H01L 21/67144 |
| | | | | 335/222 |
| 2009/0067069 A1* | 3/2009 | Matsumoto | .............. | G02B 7/102 |
| | | | | 359/824 |
| 2009/0146509 A1* | 6/2009 | Aoyagi | .............. | B06B 1/045 |
| | | | | 310/15 |
| 2011/0198948 A1* | 8/2011 | Keisuke | .............. | B06B 1/045 |
| | | | | 310/25 |
| 2012/0032619 A1* | 2/2012 | Kobayashi | .............. | F01N 13/1822 |
| | | | | 318/128 |
| 2013/0076178 A1 | 3/2013 | Kuroda et al. | | |
| 2019/0259362 A1* | 8/2019 | Kim | .............. | H04R 9/025 |
| 2020/0036236 A1* | 1/2020 | Mihaila | .............. | H02K 1/27 |

FOREIGN PATENT DOCUMENTS

| | | |
|---|---|---|
| CN | 203193471 U | 9/2013 |
| CN | 107294339 A | 10/2017 |
| GB | 2155701 | 9/1985 |
| JP | 2016150285 A | 8/2016 |
| KR | 20050121946 A | 12/2005 |
| KR | 20150107921 A | 9/2015 |
| WO | 2008004729 A1 | 1/2008 |

* cited by examiner

LINEAR ACTUATOR HAVING AN ELASTIC INJECTION-MOLDED FRAME

TECHNICAL FIELD

The embodiments described herein relate to a linear actuator, and more particularly, to a linear actuator having a frame injection-molded with an elastic material.

BACKGROUND

In general, a vibration motor has been used as a means for generating vibration, which is one of the most important characteristics of electronic devices, such as mobile phones, a motor having an eccentric shaft or having the center of gravity unevenly distributed to one side being rotated to generate vibration. However, the vibration motor has many disadvantages in that a brush passes through a pole gap between segments during the rotation of the motor, causing friction and spark, which leads to a reduced lifespan.

A linear actuator has been developed to solve the foregoing problems of the vibration motor. The linear actuator has a long lifespan, without friction and abrasion, as compared with the vibration motor, since that an actuator loaded on a spring performs a linear motion in the vertical or horizontal direction due to an electromagnetic force between a magnet and a coil to generate vibration. Also, it can be implemented in a compact type, and thus is currently developed in a variety of forms.

FIG. 1 shows one example of a conventional linear actuator. The linear actuator is roughly divided into a fixing system and a vibration system, wherein the fixing system is made of a non-magnetic material and composed of a cylindrical casing 10 having one open surface, a protector 50 for covering the open surface of the casing 10, a voice coil 30 attached to the protector 50, and a spring 40 for providing resilience to cause resonance to occur during the vibration of the vibration system. The vibration system includes a permanent magnet 20, a top plate 22 attached to the upper portion of the permanent magnet 20, a yoke 24, and a mass member 26 attached to the outside of the yoke 24 to increase a vibration weight.

In addition, an FPCB (flexible printed circuit board) 60 is attached to the top surface of the protector 50 to transfer electrical signals to the voice coil 30.

The linear actuator causes the vibration system to vibrate, using a response of a resonance frequency, such that the vibration system vibrates at a large amplitude. This large amplitude may cause separation of the spring 40 or concentric inconsistency of the spring 40 and the casing 10, which leads to defects. Further, the spring 40 and the casing 10 are attached by means of a welding, which may cause defects and complicate the process.

Furthermore, in the conventional structure, the resonance frequency of the linear actuator is determined by the rigidity of the spring 40 and the weight of the vibration system. In order to tune the resonance frequency, it is necessary to adjust the rigidity of the spring 40 and the weight of the vibration system in the linear actuator, but it is difficult to adjust the spring 40 and the vibration system because they are disposed in the casing 10 closed by the protector. If there is a change in size due to a change in weight of the vibration system, it is necessary to change the design of most components, which leads to monetary damages. Moreover, if the size is fixed, it is difficult to change the weight.

Therefore, there has been the need for the linear actuator which makes it possible to easily tune the resonance frequency of the linear actuator and to minimize the design change of the components during the tuning.

SUMMARY

Described herein is a linear actuator which makes it possible to easily tune a resonance frequency of the linear actuator and to minimize a design change of components during the tuning.

According to an embodiment, there is provided a linear actuator having an elastic injection-molded frame, including a yoke having a bottom surface and a side surface, a permanent magnet attached to the bottom surface of the yoke at a distance from the side surface of the yoke, a top plate attached to the top surface of the permanent magnet, a frame coupled to the outer periphery of the yoke and injection-molded with an elastic material, a protector disposed on the frame, and a coil secured to the protector, with a lower end positioned between the permanent magnet and the side surface of the yoke, wherein the frame includes a yoke coupling portion coupled to the yoke, a fixing portion spaced apart from the yoke coupling portion and coupled to the protector, and two or more bridges for elastically connecting the yoke coupling portion and the fixing portion.

In some embodiments, the yoke and the frame may include a recess and a projection engaged with each other to enhance the coupling force.

In some embodiments, the linear actuator may optionally include a weight secured to the bottom surface of the yoke to be able to adjust a resonance frequency.

In some embodiments, the linear actuator may optionally include a weight coupled to the top surface of the top plate to be able to adjust a resonance frequency.

In some embodiments, the protector may include an inner bent portion downwardly bent to surround the inner surface of the fixing portion of the frame and an outer bent portion bent to surround the outer surface of the fixing portion of the frame.

In some embodiments, the coil may be attached to the injection-molded protector or may be insert-molded during the injection molding of the protector and coupled to the protector, and the coil may be secured directly to the protector or may be wound around a bobbin and the bobbin may be secured to the protector.

In some embodiments, the linear actuator may further include an FPCB attached to the bottom surface of the protector and having an inner contact, to which the coil is soldered, and an outer contact exposed to the outside.

The linear actuator makes it possible to easily tune the resonance frequency of the linear actuator merely by changing the design of the bridges of the elastic injection-molded frame, without having to change the design of the other components, since the bridges of the elastic injection-molded frame replace the conventional spring.

In addition, the linear actuator can further include the weight as desired, and the weight can project to the outside of the frame, which makes it possible to adjust the weight of the weight without having to change the design of the other components. As a result, it is possible to tune the resonance frequency of the linear actuator simply by changing the weight of the vibration system.

Those skilled in the art will recognize additional features and advantages upon reading the following detailed description, and upon viewing the accompanying drawings.

DETAILED DESCRIPTION

Hereinafter, preferred embodiments of a linear actuator having an elastic injection-molded frame will be described in detail with reference to the accompanying drawings.

Figure 1:
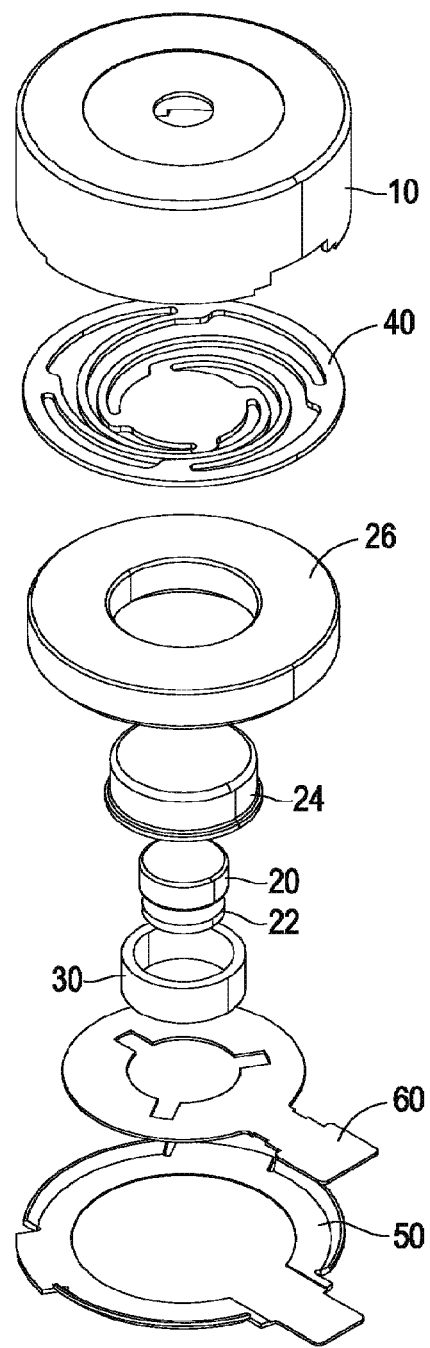
FIG. 1 is an exploded view showing a conventional linear actuator.
Figure 2:
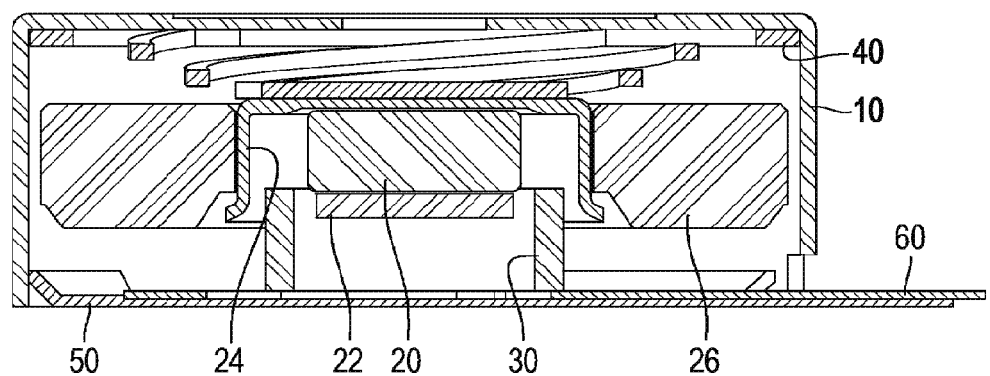
FIG. 2 is a sectional view showing the conventional linear actuator.
Figure 3:
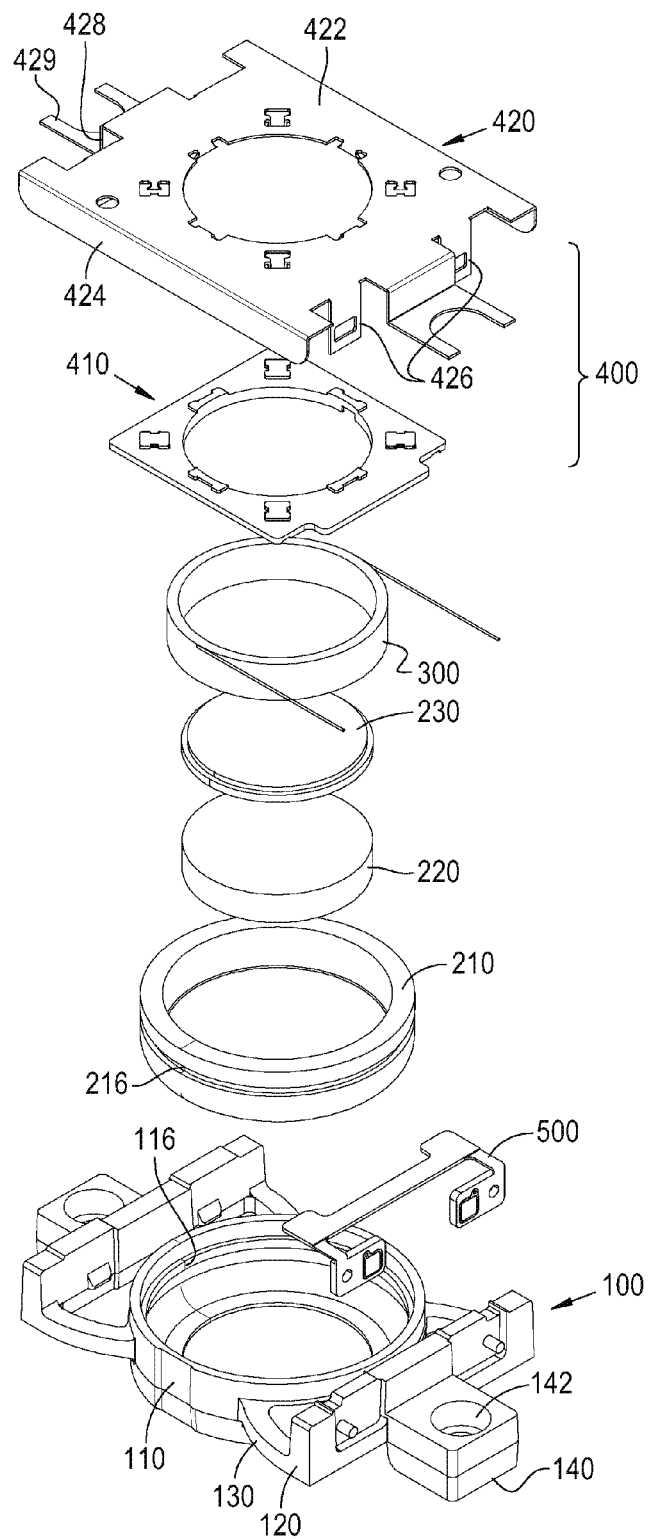
FIG. 3 is an exploded view showing a linear actuator having an elastic injection-molded frame according to a first embodiment.
Figure 4:
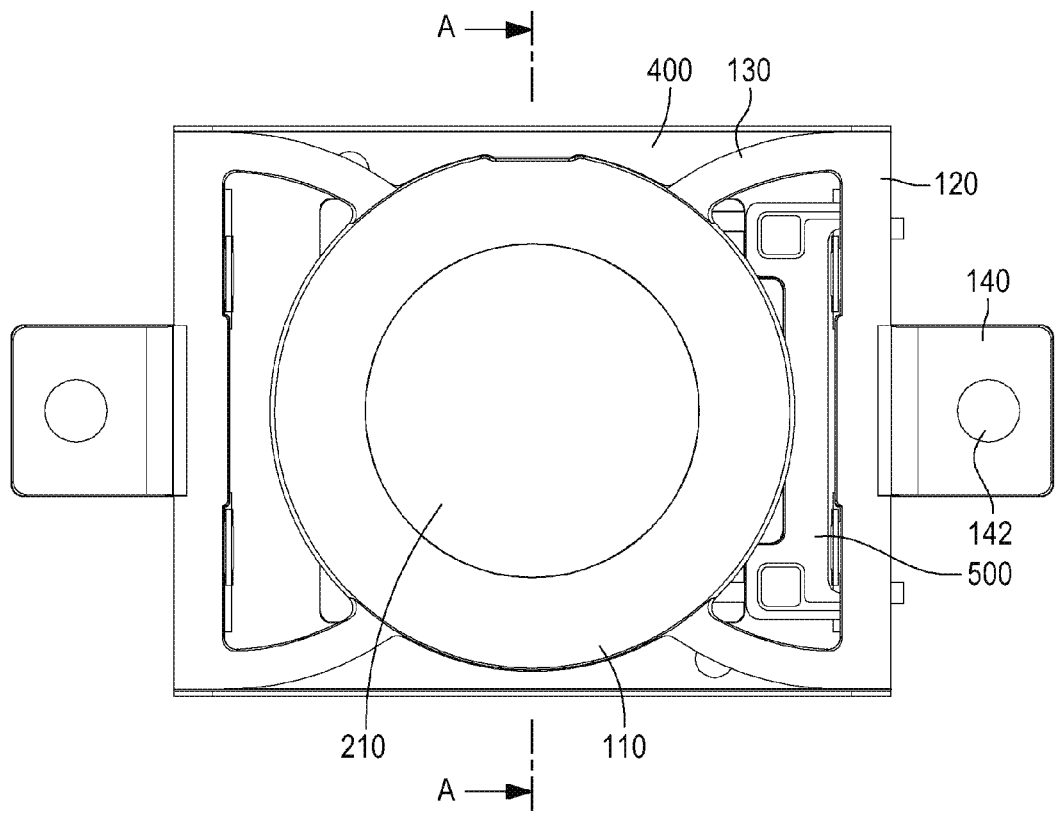
FIG. 4 is a bottom view showing the linear actuator having the elastic injection-molded frame according to the first embodiment.
Figure 5:
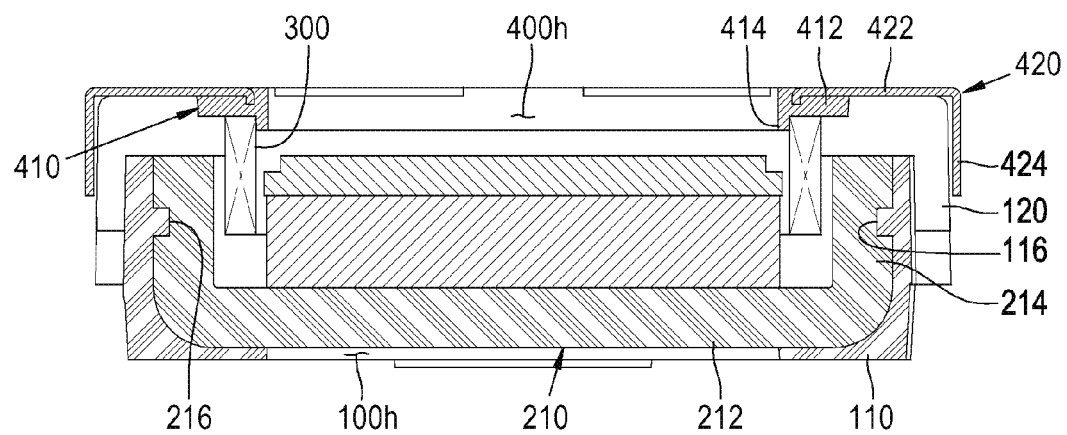
FIG. 5 is a sectional view taken along line A-A of FIG. 4.

FIG. 3 is an exploded view showing a linear actuator having an elastic injection-molded frame according to a first embodiment, FIG. 4 is a bottom view showing the linear actuator having the elastic injection-molded frame according to the first embodiment, and FIG. 5 is a sectional view taken along line A-A of FIG. 4.

The linear actuator having the elastic injection-molded frame according to the first embodiment includes, as a vibration system, a yoke 210 having a bottom surface 212 and a side surface 214, a permanent magnet 220 attached to the bottom surface 212 of the yoke 210 at a distance from the side surface 214 of the yoke 210, a top plate 230 attached to the top surface of the permanent magnet 220, a frame 100 coupled to the outer periphery of the yoke 210 and injection-molded with an elastic material, a protector 400 disposed on the frame 100, and a coil 300 secured to the protector 400, with a lower end positioned between the permanent magnet 220 and the side surface 214 of the yoke 210, wherein the frame 100 includes a yoke coupling portion 110 coupled to the yoke 210, a fixing portion 120 spaced apart from the yoke coupling portion 110 and coupled to the protector 400, and two or more bridges 130 for elastically connecting the yoke coupling portion 110 and the fixing portion 120. In addition, an FPCB 500 is attached to the bottom surface of the protector 400 that applies electrical signals from the outside to the coil 300.

In the linear actuator according to the first embodiment, the permanent magnet 220 and the top plate 230 are formed in a circular shape, and thus the yoke 210 and the coil 300 are formed in a cylindrical shape. The yoke coupling portion 110 of the frame 100 that surrounds the outer periphery of the yoke 210 is also formed in a cylindrical shape, with a through hole 100*h* at the center. A recess 216 is formed in the side surface 214 of the yoke 210 in a transverse direction along the outer periphery, while a projection 116 is provided on the yoke coupling portion 110 to be fitted into the recess 216. The projection 116 is formed by insert-molding the yoke 210, during the injection molding of the frame 100, such that an injection molding material flows into the recess 216. Alternatively, the yoke 210 may have a projection projecting in a transverse direction along the outer periphery, while the yoke coupling portion 110 of the frame 100 may have a recess. Further, the yoke 210 may not be insert-molded but be attached to the frame 100 by a bond, after the injection molding of the frame 100, and the bond should be applied to one or more points of the contact portions between the frame 100 and the yoke 210.

In the frame 100, a pair of fixing portions 120 are provided at the opposite sides of the yoke coupling portion 110 at a distance. The fixing portions 120 are formed in a bar shape in the first embodiment to be easily prepared and coupled to other components, but the present invention is not limited thereto. Four bridges 130 are provided to connect both ends of each fixing portion 120 and the yoke coupling portion. The bridges 130 are components replacing a conventional spring. Since the frame 100 is injection-molded with an elastic material, the bridges 130 are elastically deformed to support the yoke coupling portion 110 of the frame 100, such that the actuator and the yoke coupling portion 110 vibrate due to the mutual electromagnetic force of the coil 300 and the magnetic circuit composed of the yoke 210, the permanent magnet 220 and the top plate 230. The frame 100 further includes fastening portions 140 extended to the outside. The fastening portions 140 have a fastening hole 142 for screw coupling.

The protector 400 coupled to the upper portion of the frame 100 serves to secure the coil 300 and protect the components disposed inside the frame 100. The protector 400 is composed of an injection-molded part 410 and a metal part 420 coupled to each other. In the linear actuator according to the first embodiment, the coil 300 and the metal part 420 are insert-molded and coupled during the molding of the injection-molded part 410 of the protector 400. A plurality of holes are formed in the top surface 422 of the metal part 420 to aid in introducing an injection molding material, during the molding of the injection-molded part 410, to firmly couple the metal part 420 and the injection-molded part 410. Meanwhile, the metal part 420 includes a pair of bent portions 424 surrounding both ends of the fixing portions 120 of the frame 100. One bent portion 424 extends from the end of the fixing portion 120 at one side to the end of the fixing portion 120 at the other side. Therefore, the longitudinal direction of the fixing portion 120 is perpendicular to the longitudinal direction of the bent portion 424.

As described above, the coil 300 is insert-molded during the molding of the injection-molded part 410, wherein the injection-molded part 410 includes a through hole 400*h* at the center, a flange portion 412 coupled to the frame 100 and the voice coil, and a coil guide portion 414 provided at the circumference of the through hole 400*h* to position the coil 300 in a transverse direction. The coil guide portion 414 projects more downwardly than the flange portion 412 and is brought into contact with the inner periphery of the coil 300. Accordingly, the height of the coil 300 is determined depending on the height of the flange portion 412, while the position of the coil 300 in a transverse direction is determined by the coil guide portion 414.

Figure 6:
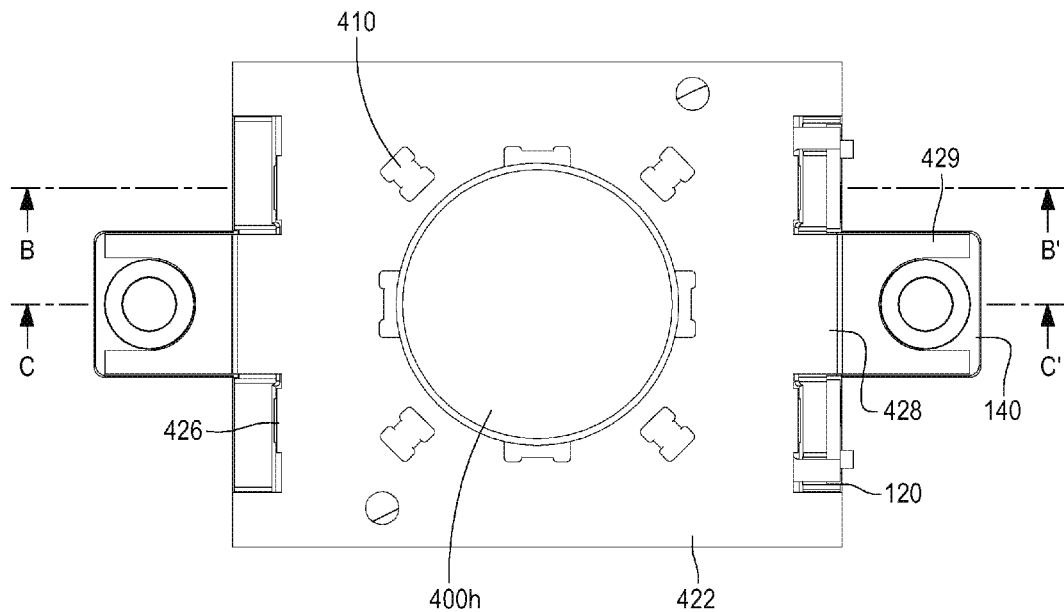
FIG. 6 is a plan view showing the linear actuator having the elastic injection-molded frame according to the first embodiment.
Figure 7:
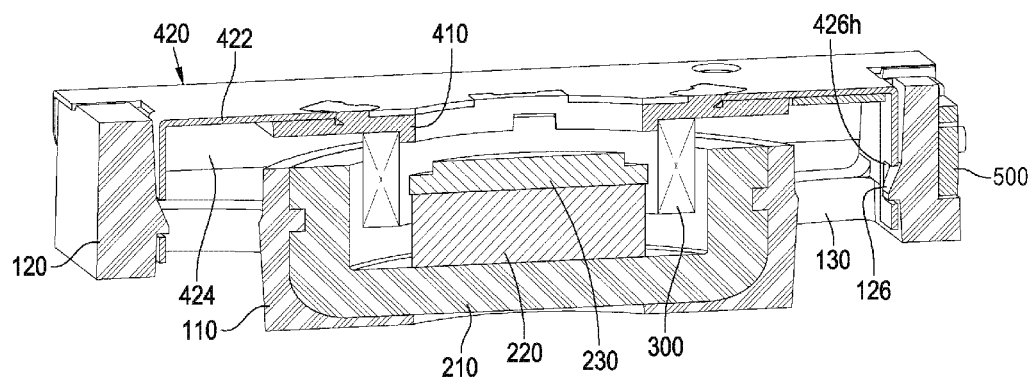
FIG. 7 is a sectional view taken along line B-B' of FIG. 6.
Figure 8:
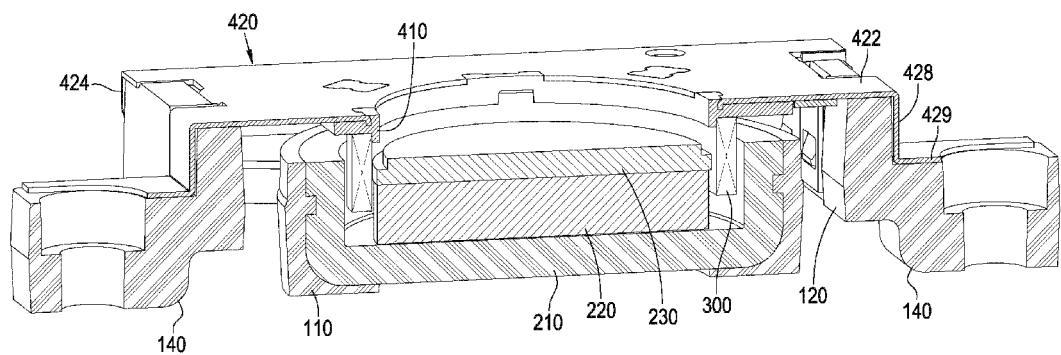
FIG. 8 is a sectional view taken along line C-C' of FIG. 6.
Figure 9:
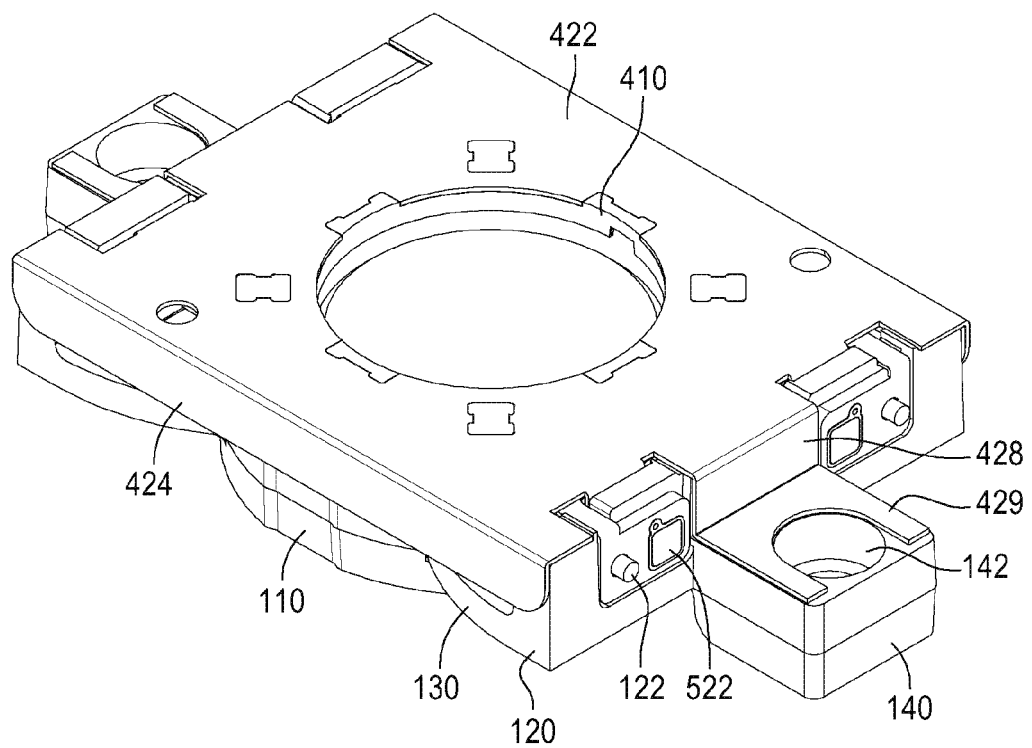
FIG. 9 is a perspective view showing the linear actuator having the elastic injection-molded frame according to the first embodiment.

FIG. 6 is a plan view showing the linear actuator having the elastic injection-molded frame according to the first embodiment, FIG. 7 is a sectional view taken along line B-B' of FIG. 6, FIG. 8 is a sectional view taken along line C-C' of FIG. 6, and FIG. 9 is a perspective view showing the linear actuator having the elastic injection-molded frame according to the first embodiment.

The protector 400 serves not only to secure the coil 300 and protect the components provided inside the frame 100 but also to prevent vibration of the fixing portions 120 of the frame 100. In order to facilitate vibration of the vibration system, it is necessary to suppress vibration or deformation of the fixing portions 120. To this end, the metal part 420 of the protector 400 includes inner bent portions 426 downwardly bent to touch the inner surfaces of the fixing portions 120 of the frame 100. Each of the inner bent portions 426 has a hole for preventing separation of the protector 400 and guiding the fixing position of the inner bent portion 426, and the inner surface of the fixing portion 120 has inclined projections 126. The inclined projections 126 have a downwardly increasing height not to easily separate from the holes of the inner bent portions, when fitted into the holes. In addition, the metal part 420 of the protector 400 includes outer bent portions 428 extended to the outside and bent to surround the outside of the fixing portions 120 of the frame 100. Thus, the metal part 420 of the protector 400 can secure the inside and outside of the fixing portions 120 of the frame 100 to prevent shaking of the fixing portions 120.

Meanwhile, in order to further suppress vibration of the fixing portions 120, the frame 100 includes fastening portions 140 extended to the outside of the fixing portions 120 to be screw-fastened, and the metal part 420 of the protector 400 includes fastening portions 429 extended to the outside to be screw-fastened together with the fastening portions 140 of the frame 100. Preferably, the fastening portions 140 of the metal part 420 extend from the outer bent portions 428. Each of the fastening portions 140 of the frame 100 has a fastening hole 142 to which a screw can be fastened, and each of the fastening portions 429 of the protector 400 has a U-shaped groove at the end to facilitate the screw fastening. Also, the fastening portions 140 of the frame 100 and the fastening portions 429 of the protector 400 can serve to secure the actuator to an equipment to which the actuator is to be installed.

Figure 10:
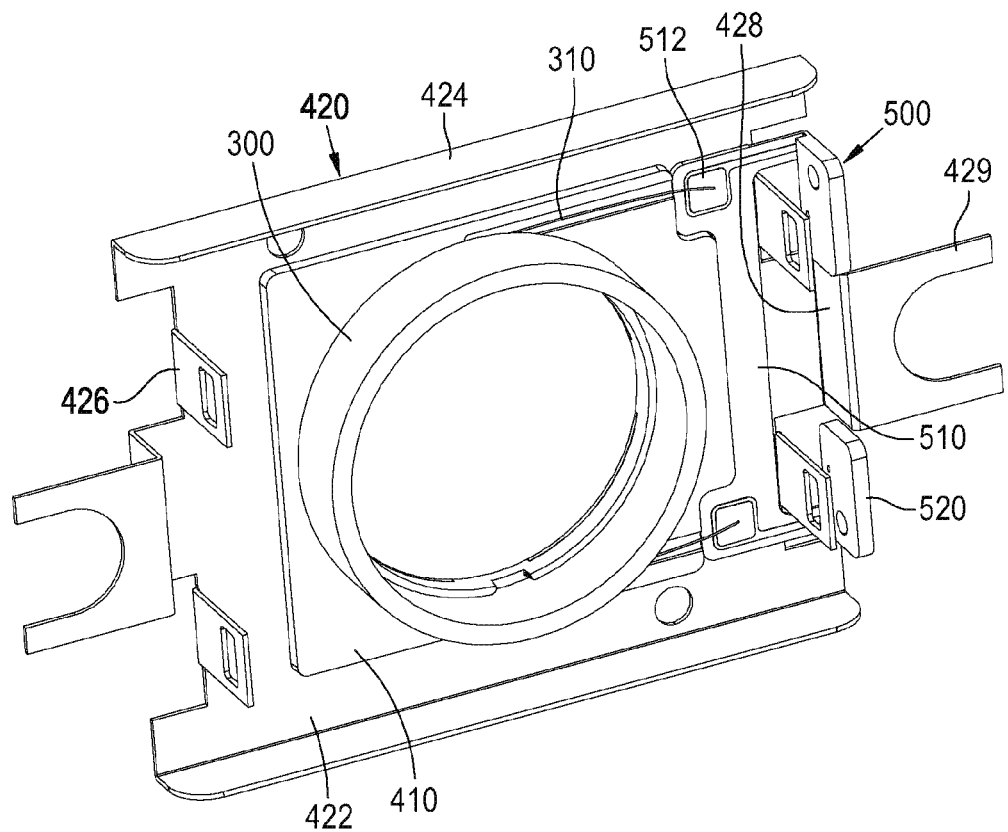
FIG. 10 is an assembly view showing a protector, voice coil and FPCB provided in the linear actuator having the elastic injection-molded frame according to the first embodiment.

FIG. 10 is an assembly view showing the protector, the coil and the FPCB provided in the linear actuator having the elastic injection-molded frame according to the first embodiment. Referring to FIGS. 9 and 10, the FPCB 500 that transfer electrical signals to the coil 300 is attached to the bottom surface of the protector 400, more specifically, to the bottom surface of the metal part 420 of the protector 400. The FPCB 500 has one end 510 attached to the metal part 420, then extends to the outside, and then has the other ends 520 secured to the fixing portions 120 of the frame 100. Land portions 512 for the connection of lead wires 310 of the coil 300 are provided at one end 510 of the FPCB 500, while land portions 522 for the application of external signals are provided at the other ends 520 extending to the outside. In order to facilitate the assembly of the FPCB 500, holes may be formed at the other ends 520, and the fixing portion 120 of the frame 100 may include projections 122 fitted into the holes.

The other ends 520 of the FPCB 500 may be provided in pairs to transfer (+) and (−) signals to both sides of the outer bent portion 428 of the protector 400, respectively, avoiding the outer bent portion 428. Further, grooves for use in installing the FPCB 500 may be formed in the outer surfaces of the fixing portions 120 of the frame 100 to facilitate the assembly of the FPCB 500 and protect the FPCB 500. If the FPCB 500 is disposed in the grooves, it does not more project than the outer surfaces of the fixing portions 120, which makes it possible to protect the FPCB land portions 522.

Figure 11:
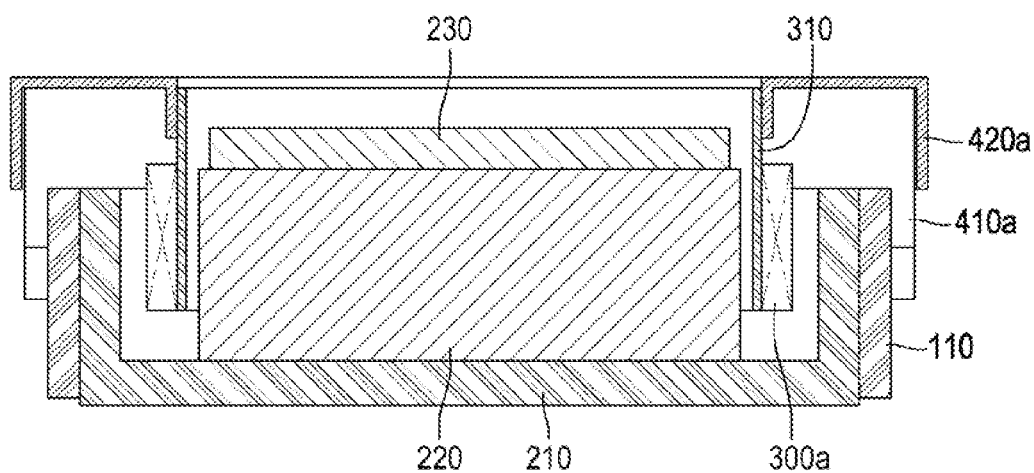
FIG. 11 is a sectional view showing a linear actuator having an elastic injection-molded frame according to a second embodiment.

FIG. 11 is a sectional view showing a linear actuator having an elastic injection-molded frame according to a second embodiment. The linear actuator according to the second embodiment is the same as the linear actuator according to the first embodiment, except for an installation structure of a coil 300a.

In the linear actuator according to the second embodiment, the coil 300a is wound around a bobbin 310, and then coupled to a protector 400a. The protector 400a composed of an injection-molded part 410a and a metal part 420a is molded, and then the bobbin 310 and the coil 300a are bonded to the protector 400a.

Figure 12:
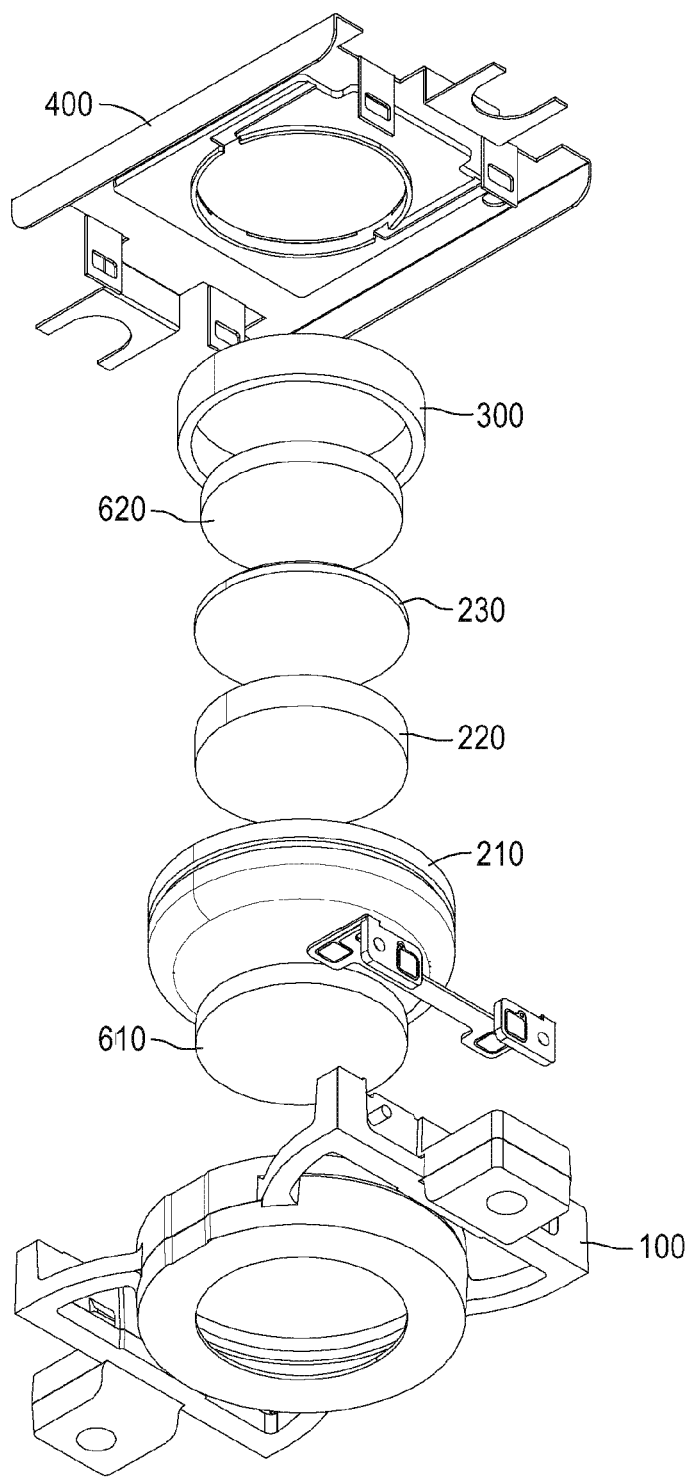
FIG. 12 is a sectional view showing a linear actuator having an elastic injection-molded frame according to a third embodiment.
Figure 13:
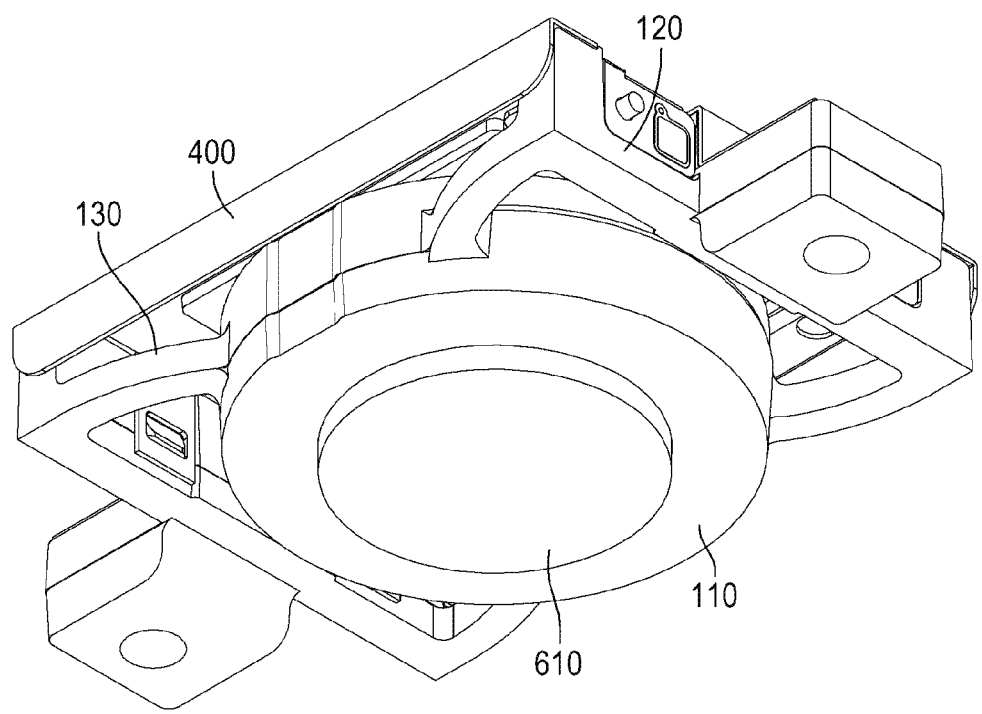
FIG. 13 is a bottom perspective view showing the linear actuator having the elastic injection-molded frame according to the third embodiment.
Figure 14:
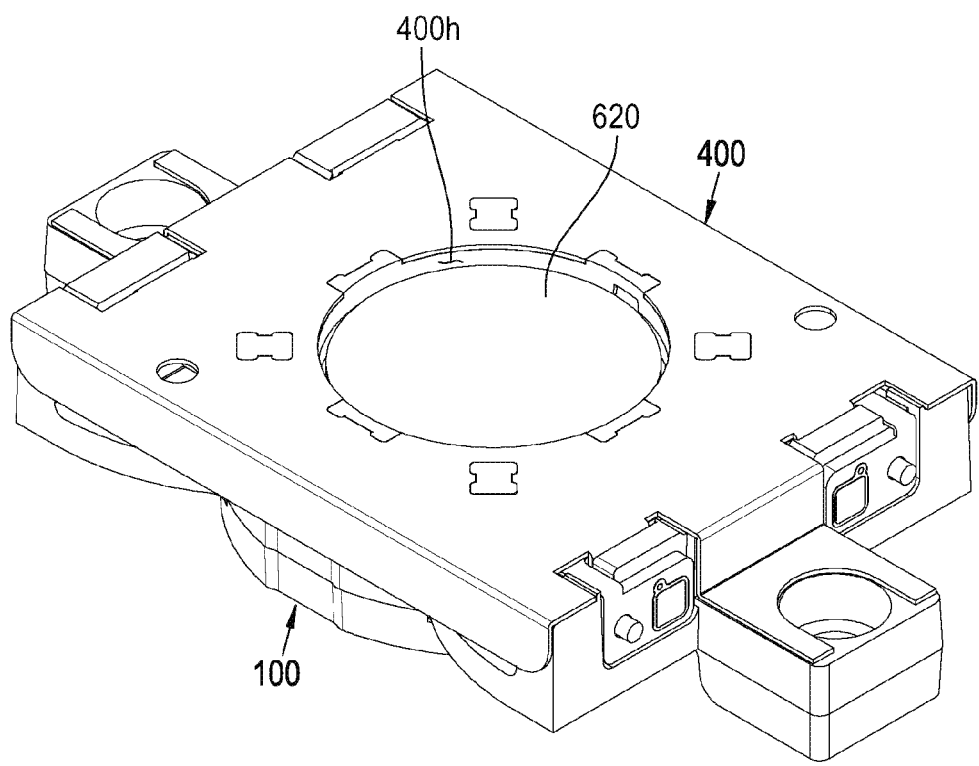
FIG. 14 is a top perspective view showing the linear actuator having the elastic injection-molded frame according to the third embodiment.

FIG. 12 is a sectional view showing a linear actuator having an elastic injection-molded frame according to a third embodiment, FIG. 13 is a bottom perspective view showing the linear actuator having the elastic injection-molded frame according to the third embodiment, and FIG. 14 is a top perspective view showing the linear actuator having the elastic injection-molded frame according to the third embodiment. The linear actuator according to the third embodiment is the same as the linear actuator according to the first or second embodiment, except for the installation of a further weight.

The linear actuator according to the third embodiment may optionally further include one or more of a first weight 610 attached to the lower portion of the yoke 210 and a second weight 620 attached to the upper portion of the top plate 230. Referring to FIG. 5, the linear actuator having the elastic injection-molded frame has an advantage in that, even after all the components except the weight 610 are assembled, it is possible for the first weight 610 to be further added, as desired, to tune a resonance frequency of the linear actuator. In addition, preferably, the diameter of the weight 620 attached to the upper portion of the top plate 230 is smaller than the diameter of the through hole 400h to prevent interferences.

It is possible to change the weight of the weights 610 and 620 by changing the height while maintaining the diameter. Accordingly, the linear actuator according to the third embodiment has an advantage in that it is possible to simply adjust the weight of the vibration system to tune the resonance frequency, by adding the weights 610 and 620 and changing their weight.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:
1. A linear actuator having an elastic injection-molded frame, the linear actuator comprising:

a yoke having a bottom surface and a side surface;
a permanent magnet attached to the bottom surface of the yoke at a distance from the side surface of the yoke;
a top plate attached to a top surface of the permanent magnet;
a frame coupled to an outer periphery of the yoke and injection-molded with an elastic material;
a protector disposed on the frame; and
a coil secured to the protector, with a lower end positioned between the permanent magnet and the side surface of the yoke,
wherein the frame comprises a yoke coupling portion coupled to the yoke, a fixing portion spaced apart from the yoke coupling portion and coupled to the protector, and two or more bridges for elastically connecting the yoke coupling portion and the fixing portion.

2. The linear actuator of claim 1, wherein the yoke and the frame comprise a recess and a projection engaged with each other to enhance the coupling force.

3. The linear actuator of claim 1, further comprising a weight coupled to a lower portion of the yoke for adjusting a resonance frequency.

4. The linear actuator of claim 1, further comprising a weight coupled to an upper portion of the top plate for adjusting a resonance frequency.

5. The linear actuator of claim 1, wherein the protector comprises an inner bent portion downwardly bent to surround an inner surface of the fixing portion of the frame and an outer bent portion bent to surround an outer surface of the fixing portion of the frame.

6. The linear actuator of claim 1, wherein the frame comprises a fastening portion extended to an outside of the fixing portion to be screw-fastened, and wherein the protector comprises a fastening portion extended to the outside to be screw-fastened together with the fastening portion of the frame.

7. The linear actuator of claim 1, wherein the coil is attached to the injection-molded protector or is insert-molded during the injection molding of the protector and coupled to the protector, and wherein the coil is secured directly to the protector or is wound around a bobbin and the bobbin is secured to the protector.

8. The linear actuator of claim 1, further comprising an FPCB attached to a bottom surface of the protector and having an inner contact, to which the coil is soldered, and an outer contact exposed to the outside.

* * * * *